United States Patent [19]

Shinjo et al.

[11] Patent Number: 5,581,381
[45] Date of Patent: Dec. 3, 1996

[54] LCD ELECTRODE PROJECTIONS OF VARIABLE WIDTHS AND SPACINGS

[75] Inventors: Katsuhiko Shinjo, Isehara; Shuzo Kaneko, Yokohama; Shinjiro Okada, Isehara; Hirokatsu Miyata, Yokohama, all of Japan

[73] Assignee: Canon Kabushiki Kaisha, Tokyo, Japan

[21] Appl. No.: 254,065

[22] Filed: Jun. 3, 1994

[30] Foreign Application Priority Data

Jun. 4, 1993 [JP] Japan ................................ 5-158036

[51] Int. Cl.⁶ ................... G02F 1/1333; G02F 1/1343
[52] U.S. Cl. ............................ 349/85; 359/67; 359/87
[58] Field of Search ........................ 359/68, 54, 87, 359/62, 67

[56] References Cited

U.S. PATENT DOCUMENTS

| | | | |
|---|---|---|---|
| 4,632,514 | 12/1986 | Ogawa et al. | 359/68 |
| 4,712,877 | 12/1987 | Okada et al. | 359/56 |
| 4,815,823 | 3/1989 | Kaneko | 359/54 |
| 4,840,460 | 6/1989 | Bernot et al. | 359/59 |
| 4,973,135 | 11/1990 | Okada et al. | 359/56 |
| 5,026,144 | 6/1991 | Taniguchi et al. | 359/56 |
| 5,119,219 | 6/1992 | Terada et al. | 359/56 |
| 5,251,050 | 10/1993 | Kurematsu et al. | 359/57 |
| 5,347,393 | 9/1994 | Van Haaren et al. | 359/87 |
| 5,446,570 | 8/1995 | Kaneko et al. | 359/87 |
| 5,495,352 | 2/1996 | Shinjo et al. | 359/54 |

FOREIGN PATENT DOCUMENTS

| | | | |
|---|---|---|---|
| 0584963 | 7/1993 | European Pat. Off. | |
| 59-029227 | 2/1984 | Japan . | |
| 59-193427 | 11/1984 | Japan . | |
| 3-036520 | 2/1991 | Japan | 359/87 |

OTHER PUBLICATIONS

Patent Abstracts of Japan, vol. 015, No. 198 (P–1204) May 22, 1991, & JP–A–03 048 819 (Matsushita Electric Ind Co. Ltd) Mar. 1, 1991.

Patent Abstracts of Japan, vol. 016, No. 390 (P–1405) Aug. 19, 1992, & JP–A–04 127 124 (Asahi Chem Ind Co Ltd) Apr. 28, 1992.

Patent Abstracts of Japan, vol. 011, No. 383 (P–646) Dec. 15, 1987 & JP–A–62–150–226 (Seiko Epson Corp) Jul. 4, 1987 *abstract*.

Patent Abstracts of Japan, vol. 011, No. 395 (P–650) Dec. 24, 1987 & JP–A–62 159 119 (Fujitsu Ltd) Jul. 15, 1987.

Patent Abstracts of Japan, vol. 013, No. 349 (P–911) Aug. 7, 1989 & JP–A–01 107 233 (Fujitsu Ltd) Apr. 25, 1989 *abstract*.

Primary Examiner—Anita Pellman Gross
Assistant Examiner—Walter J. Malinowski
Attorney, Agent, or Firm—Fitzpatrick, Cella, Harper & Scinto

[57] ABSTRACT

A liquid crystal device is constituted by a pair of substrates having mutually opposing electrodes thereon, and a liquid crystal layer disposed between the substrates so as to form a pixel comprising a pair of the opposing electrodes and the liquid crystal layer therebetween. The liquid crystal layer in a pixel is divided into a plurality of regions having mutually different liquid crystal layer thicknesses, and the pixel is constituted so as to show an applied voltage-transmittance characteristic having an improved linearity. More specifically, for example, the liquid crystal layer in a pixel is provided with locally varying thicknesses by forming on a substrate pluralities of stripe-shaped projections and indentations at locally different indentation widths so that the projections have a smaller width in a region having a smaller indentation width than in a region having a larger indentation width.

20 Claims, 10 Drawing Sheets

STRIPE DIRECTION

LCD ELECTRODE PROJECTIONS OF VARIABLE WIDTHS AND SPACINGS

FIELD OF THE INVENTION AND RELATED ART

The present invention relates to a liquid crystal device suitable for use in a display apparatus, such as a television receiver, particularly a liquid crystal display device using a ferroelectric liquid crystal and still capable of gradational display.

A ferroelectric liquid crystal placed in a bistable state tends to assume either one of bistable states, i.e., one corresponding to an optically white (bright) state and the other corresponding to an optically black (dark) state, and does not assume an intermediate state. Accordingly, some special technique is required in order to effect a gradational display by using such a ferroelectric liquid crystal.

There is known a digital or dither technique wherein one pixel is divided into sub-pixels for driving. In a system using such a digital technique, however, as one pixel is divided into a plurality of sub-pixels for driving, so that a large number of drive electrodes are required for one pixel. As a result, the resolution is lowered and a complicated operation or drive circuit is required, so that the production yield is lowered.

There is also known an analog technique for displaying a halftone. Examples thereof include a proposal of utilizing a spontaneously occurring unevenness irregularity on an electrode plate or an intentionally formed mosaic pattern on an electrode plate (Japanese Laid-Open Patent Application (JP-A) 59-193427) or a proposal of providing a stepwise thickness change of an insulating layer on an electrode plate (JP-A 61-166590), respectively, for generating a mixture state of white and black domains in one pixel to display a halftone.

In any of the above-mentioned analog techniques, a liquid crystal layer in a liquid crystal display device is provided with regions where different effective voltages are developed when a voltage is applied between a pair of electrodes and an analog control is intended to be performed by forming a large number of such minute regions.

It has been confirmed to be possible to form a halftone state by such a known analog technique as described above, it is necessary to obtain a relationship between an applied voltage amplitude or pulse width and a resultant transmittance (hereinafter referred to as "V-T characteristic") based on which an arbitrary halftone can be obtained easily. More specifically, it is desirable to obtain a linear V-T characteristic curve having an appropriate slope at a pixel or a unit display element.

Further, such a linear V-T characteristic curve is desirable also in case where the characteristic change of a ferroelectric liquid crystal due to a change in temperature and other factors is compensated by some technique.

As described above, in known analog techniques for halftone display, a liquid crystal layer is provided with a large number of minute regions having different effective voltages. Accordingly, such a large number of minute regions have to be individually adjusted in order to accurately adjust the V-T characteristic curve, so that it has been technically very difficult to provide an ideal linear V-T characteristic curve.

SUMMARY OF THE INVENTION

A principal object of the present invention is to provide a liquid crystal device, particularly a ferroelectric liquid crystal device, of which the V-T characteristic curve can be easily formulated into a linear one having an appropriate slope.

According to a generic aspect of the present invention, there is provided a liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions having mutually different liquid crystal layer thicknesses, and the pixel is constituted so as to show an applied voltage-transmittance characteristic having an improved linearity.

According to a more specific aspect of the present invention, there is provided a liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the liquid crystal layer has a thickness D corresponding to the indentation in a region having a largest indentation width with respect to a projection height d, and a ratio d/D is set to be substantially equal to $1-(1/\lambda)$ wherein $\lambda$ denotes a ratio of inversion saturation value and inversion threshold value at the liquid crystal thickness D.

According to another aspect of the present invention, there is provided a liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the projections have a smaller width in a region having a smaller indentation width than in a region having a larger indentation width.

According to another aspect of the present invention, there is provided a liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses, and a pixel is divided into a plurality of pixel regions including at least a pair of regions respectively provided with plural stripe-shaped projections and indentations and having mutually different projection widths or indentation widths, and each pixel is provided with light-interrupting masks so that one of the pair of regions has an inversion threshold voltage which is substantially equal to an inversion saturation voltage of the other of the pair of regions.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In the present invention, not only the liquid crystal layer thickness within a pixel is caused to vary locally to provide a prescribed V-T characteristic showing a linearity but also the structure of the pixel is improved to increase the linearity.

Hereinbelow, the present invention will be described in more detail based on three preferred embodiments.

First of all, a basic concept of obtaining a V-T characteristic for gradational display by forming unevennesses on the inner surface of a substrate to locally vary the liquid crystal layer thicknesses, has been already disclosed by our research and development group in U.S. patent application Ser. No. 099,054, now U.S. Pat. No. 5,495,352, (filed Jul. 29, 1993, corr. to European Laid-Open Patent Application (EP-A) 0584963).

A pixel structure for accomplishing the above object is described with reference to FIG. 1. According to a first embodiment, in a liquid crystal display device including a pixel structure as show in FIG. 1 comprising a pair of electrodes $1a$ and $1b$, and a liquid crystal layer 2 comprising a ferroelectric liquid crystal disposed between the electrodes $1a$ and $1b$, the liquid crystal layer 2 is provided with locally varying thicknesses by forming on a substrate a plurality of stripe-shaped projections-indentations (unevennesses) at locally different projection spacings (or locally different widths of stripe-shaped parallel indentations), so that the liquid crystal layer has a (maximum) thickness D corresponding to the indentation in a region $3a$ having a largest spacing (or indentation width) as a result of provision of the projections having a height (or indentation depth) d, and a ratio d/D is set to be substantially equal to $1-(1/\lambda)$ (d/D≈1−(1/λ)) wherein λ denotes a ratio of Vsat (inversion saturation voltage)/Vth (inversion threshold voltage) at a liquid crystal layer thickness D.

Figure 4:
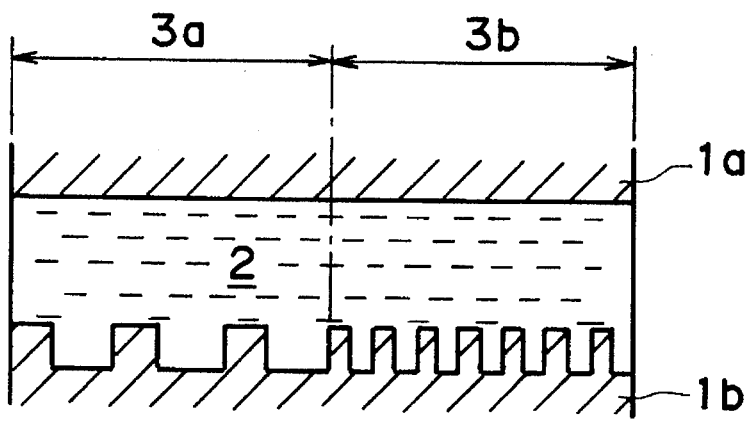
FIG. 4 is a schematic sectional view of one pixel in another embodiment of the liquid crystal display device according to the present invention.

According to a second embodiment, in a liquid crystal display device including a pixel structure as shown in FIG. 4 comprising a pair of electrodes $1a$ and $1b$, and a liquid crystal layer 2 comprising a ferroelectric liquid crystal disposed between the electrodes $1a$ and $1b$, the liquid crystal layer 2 is provided with locally varying thicknesses by forming on a substrate pluralities of stripe-shaped projections and indentations with locally different indentation widths so that the projections have a smaller width in a liquid crystal (or pixel) region $3b$ having a smaller indentation width than in a liquid crystal (or pixel) region $3a$ having a larger indentation width.

Figure 8:
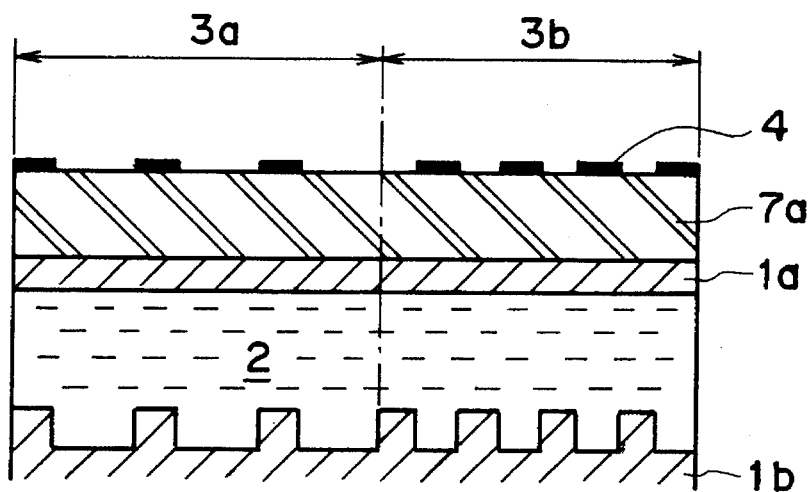
FIG. 8 is a schematic sectional view of one pixel in another embodiment of the liquid crystal display device according to the present invention.

According to a third embodiment, in a liquid crystal display device including a pixel structure as shown in FIG. 8 comprising a pair of electrodes $1a$ and $1b$, and a liquid crystal layer 2 comprising a ferroelectric liquid crystal disposed between the electrodes $1a$ and $1b$, the liquid crystal layer 2 is provided with locally varying thicknesses by dividing the pixel into a plurality of pixel regions including at least a pair of regions $3a$ and $3b$ respectively provided with plural stripe-shaped projections and indentations and having mutually different projection widths or indentation widths, and each pixel is provided with light interrupting masks 4 so that one of the pixel regions $3a$ and $3b$ has an inversion threshold voltage which is substantially equal to the inversion saturation voltage of the other.

Figure 1:
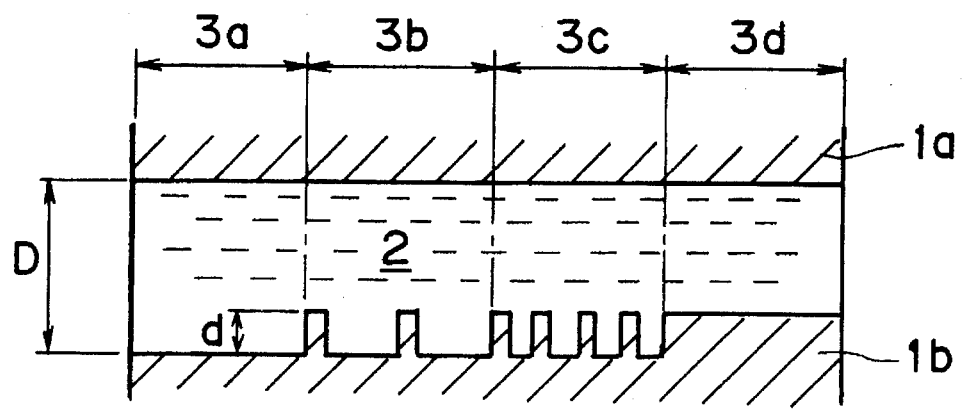
FIG. 1 is a schematic sectional view of one pixel in an embodiment of the liquid crystal display device according to the present invention.

In the first embodiment of the liquid crystal display device shown in FIG. 1, the surface of one-side electrode $1b$ is provided with plural stripe-shaped projections and indentations. By the surface state of the electrode $1b$, the liquid crystal layer (or pixel) 2 is divided into at least four regions having different indentation widths.

Herein, each unit region $3a$, $3b$ . . . , has a succession of projections and/or indentations so that the projection width and the indentation width are respectively constant in each unit region. The unit regions may include one denoted by $3a$ comprising a succession of only indentations and one denoted by $3d$ comprising a succession of only projections.

In the embodiment shown in FIG. 1, stripe-shaped projections (and indentations) are formed on the surface of the electrode $1b$ but can be formed on the surface of the other electrode $1a$. Further, not only one of the electrodes $1a$ and $1b$ but also both of the electrodes $1a$ and $1b$ can be provided with stripe-shaped projections (and indentations).

Figure 2:
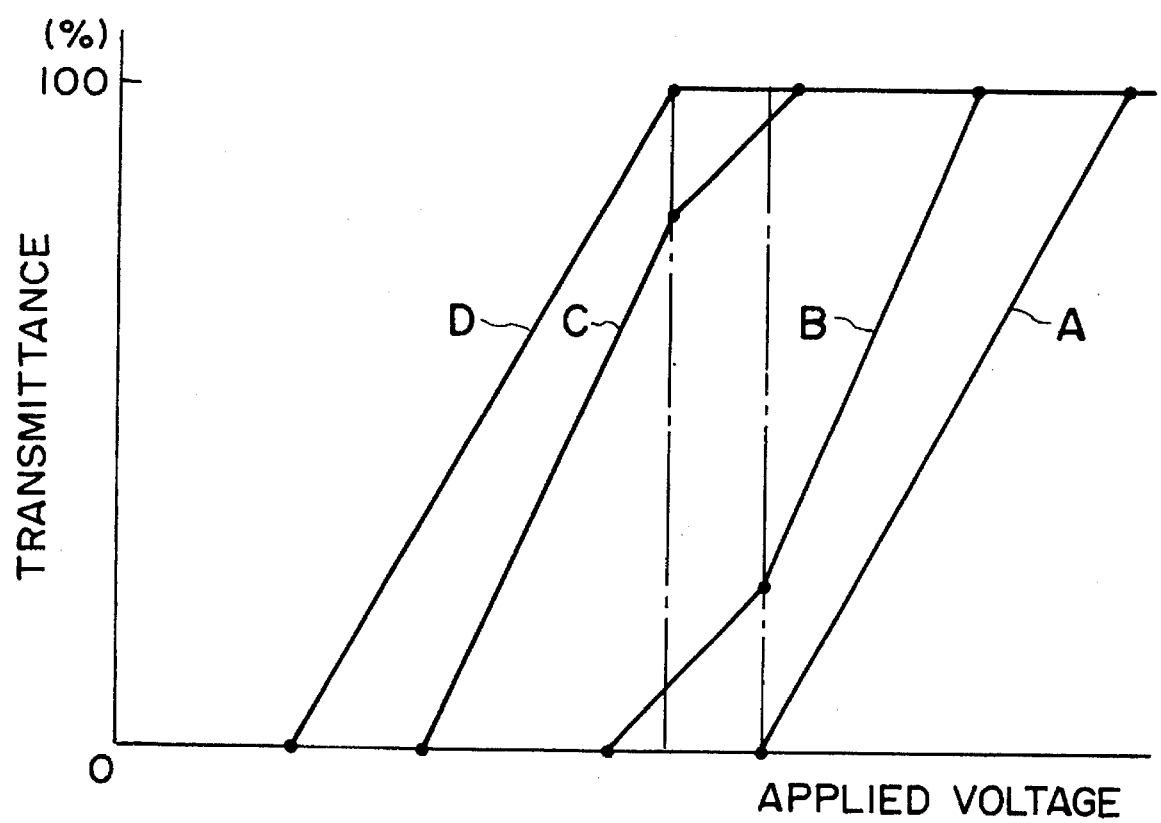
FIG. 2 is an illustration of V-T characteristic curves for respective regions in an embodiment of a liquid crystal display device having a structure as shown in FIG. 1.

FIG. 2 shows individual V-T characteristic curves A-D representing the V-T characteristic curves of the regions $3a$–$3d$, respectively, shown in FIG. 1. In FIG. 2, the ordinate represents a transmittance, and the abscissa represents an applied voltage (on a logarithmic (ln) scale).

The individual V-T characteristic curves A and D are almost linear (straight) slopes. The individual V-T characteristic curves B and C are almost (angularly) flexed lines having an intermediate point joining different V-T slopes (hereinafter referred to as a "flexure point"). The reason why such individual V-T characteristic curves A-D are given has not been fully clarified as yet. It may be however assumed that a portion of the liquid crystal layer 2 at a stepwise difference in height is placed in an unstable alignment so that the inversion is enlarged from the unstable alignment portion as a starting point, and a larger effective voltage is applied to a portion of the liquid crystal at a projection of the electrode 1b providing a smaller thickness of the liquid crystal layer2 than a portion of the liquid crystal at an indentation of the electrode 1b providing a larger thickness of the liquid crystal layer 2.

As is understood from the individual V-T characteristic curve D shown in FIG. 2, the respective liquid crystal regions 3a–3d per se show an analog-like V-T characteristic. The present invention aims at providing an overall V-T characteristic further suitable for gradation control by utilizing the analog-like V-T characteristic of the respective liquid crystal regions (or sub-pixel regions) 3a–3d.

In case where the flexure points of the individual V-T characteristic curves B and C are deviated in voltage from each other as shown in FIG. 2, a combined V-T characteristic curve for an entire pixel obtained by synthesizing the individual V-T characteristic curves A-D is caused to be flexed in a number of the flexure points. This is disadvantageous for analog gradation control.

In this embodiment, it is intended to minimize the number of flexure points in the combined V-T characteristic curve.

More specifically, the voltage values of the flexure points in the individual V-T characteristic curves in FIG. 2 are caused to substantially coincide with each other. For this purpose, a ratio d/D is set to satisfy the following equation (1):

$$d/D \approx 1 - (1/\lambda) \qquad (1),$$

where D denotes a thickness of the liquid crystal layer 2 at an indentation in a region 3a having the largest indentation width, d denotes a stepwise difference in height between the projection and indentation (or simply a projection height), and $\lambda$ denotes a ratio of Vsat (inversion saturation voltage)/Vth (inversion threshold voltage) at the liquid crystal layer thickness D.

The meaning of the equation (1) is further explained. The inversion saturation voltage for a liquid crystal region 3d having a thickness D–d is $\lambda \times (1-d/D) \times Vth$. If this value is assumed to be equal to an inversion threshold voltage Vth, the following equation is given: $\lambda \times (1-d/D) \times Vth = Vth$, which is reduced to the above equation (1).

The values of $\lambda$ for the liquid crystal regions 3b and 3c can vary depending on the indentation widths and the projection widths in the regions 3b and 3c so that the voltages of the flexure points cannot completely agree to each other even if the d/D satisfies the equation (1) but a substantial agreement can be obtained. Particularly, the values of $\lambda$ for the liquid crystal regions 3b and 3c can be adjusted by changing the areal ratio of the cross-sectional (or horizontal) area between the indentations and the projections, so that it is desirable to provide as constant a ratio as possible by adjusting the areal ratio.

Figure 3:
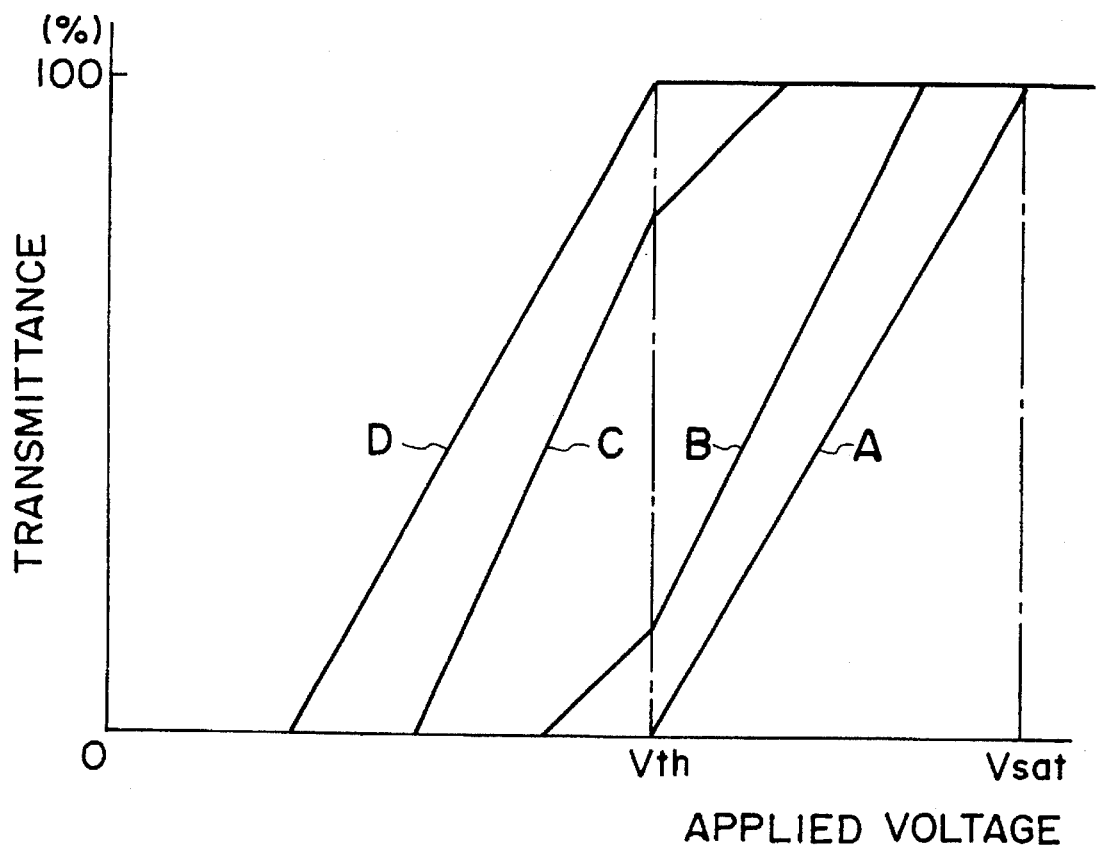
FIG. 3 is an illustration of V-T characteristic curves for respective regions in another embodiment of a liquid crystal display device having a structure as shown in FIG. 1.

If the voltage values of the individual V-T characteristic curves B and C substantially agree to each other as shown in FIG. 3, a combined V-T characteristic curve obtained by synthesizing the individual V-T characteristic curves shown in FIG. 3 is reduced to a flexed line having substantially one flexure point, which is advantageous for analog gradation control.

Next, the second embodiment will be described.

A liquid crystal display device according to this embodiment shown in FIG. 4 is basically similar to the one shown in FIG. 1 according to the first embodiment but is characterized in that a projection width in a liquid crystal region 3b having a smaller indentation width is smaller than that in a region 3a having a larger indentation width.

Figure 5:
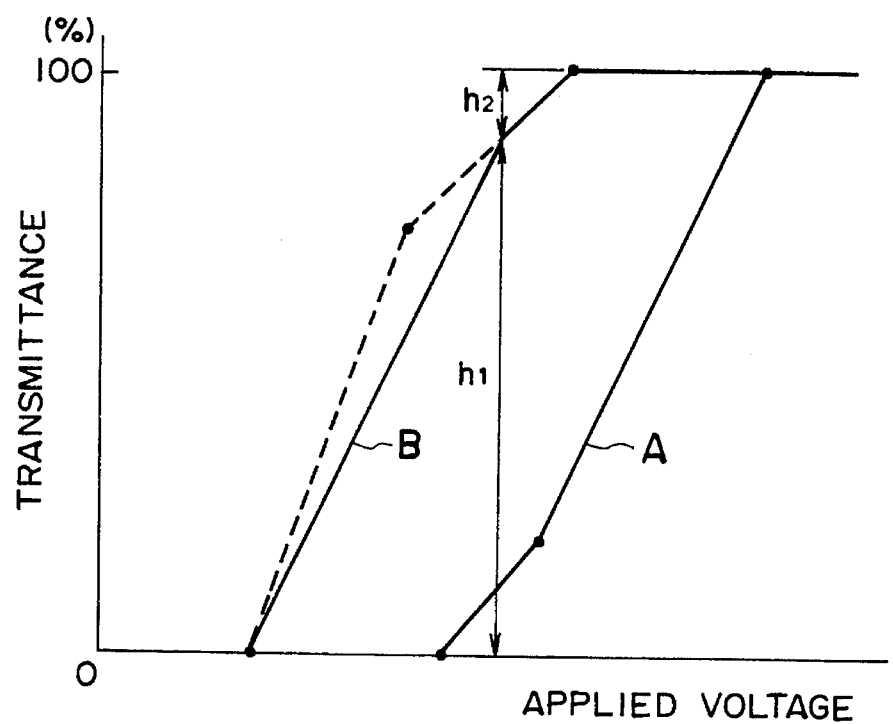
FIGS. 5 and 6 are respectively an illustration of V-T characteristic curves for respective regions in an embodiment of a liquid crystal display device having a structure as shown in FIG. 4.

When the indentation widths and the projection widths are adjusted in the above-described manner, the liquid crystal regions 3a and 3b are caused to have individual V-T characteristic curves A and B as shown in FIG. 5.

A ratio $h_1/h_2$ between $h_1$ and $h_2$ in FIG. 5 is substantially equal to a ratio between the widths of the projections and the indentations in the liquid crystal region 3b corresponding to the individual V-T characteristic curve B concerned.

This is explained in more detail. A thinner liquid crystal layer corresponding to a projection can receive a larger effective voltage to initiate the inversion, followed by inversion of a thicker liquid crystal layer region receiving a smaller effective voltage corresponding to an indentation. More specifically, the range of $h_1$ is caused by inversion of a portion corresponding to the projections and the range of $h_2$ is caused by inversion of a portion corresponding to the indentations, so that the ratio $h_1/h_2$ is substantially equal to the ratio of widths of the projections and the indentations.

In other words, in this second embodiment, the projections are formed in a smaller width in a liquid crystal region 3b having a smaller indentation width, and a larger projection width is provided in a region 3a having a larger indentation width.

For example, if the indentation width in the liquid crystal region 3b is wider, the flexure point in the individual V-T characteristic curve B is shifted toward the center and the flexure becomes larger as represented by a dotted line in FIG. 5. However, if the indentation width is small, the flexure point on the individual V-T characteristic curve B is shifted toward the inversion saturation point and the flexure becomes smaller as represented by a solid line.

If the individual V-T characteristic curves A and B are made closer to straight lines in the above-described manner, a combined V-T characteristic curve for an entire pixel formed by synthesizing the individual V-T characteristics is provided with a more straight line characteristic, which is more advantageous for analog gradation control. Further, if the voltage values at the flexure points on the individual V-T characteristic curves A and B are made substantially identical to each other, an advantage similar to that in the first embodiment can be attained.

Now, the flexure points are moved so that $h_1$ corresponds to a transmittance of 10% or below or 90% or above and the individual V-T characteristic curves A and B are approximated as straight lines passing through the points of transmittance=10% and 90%. Further, the voltage values $Vth_1$ and Vth at the intersections of the straight lines with a line of transmittance being 0% are assumed as inversion threshold values at the liquid crystal regions 3a and 3b, respectively, and the voltage values $Vsat_1$ and $Vsat_2$ at the intersections of the straight lines with a line of transmittance being 100% are assumed as inversion saturation values at the liquid crystal regions 3a and 3b, respectively.

Figure 6:
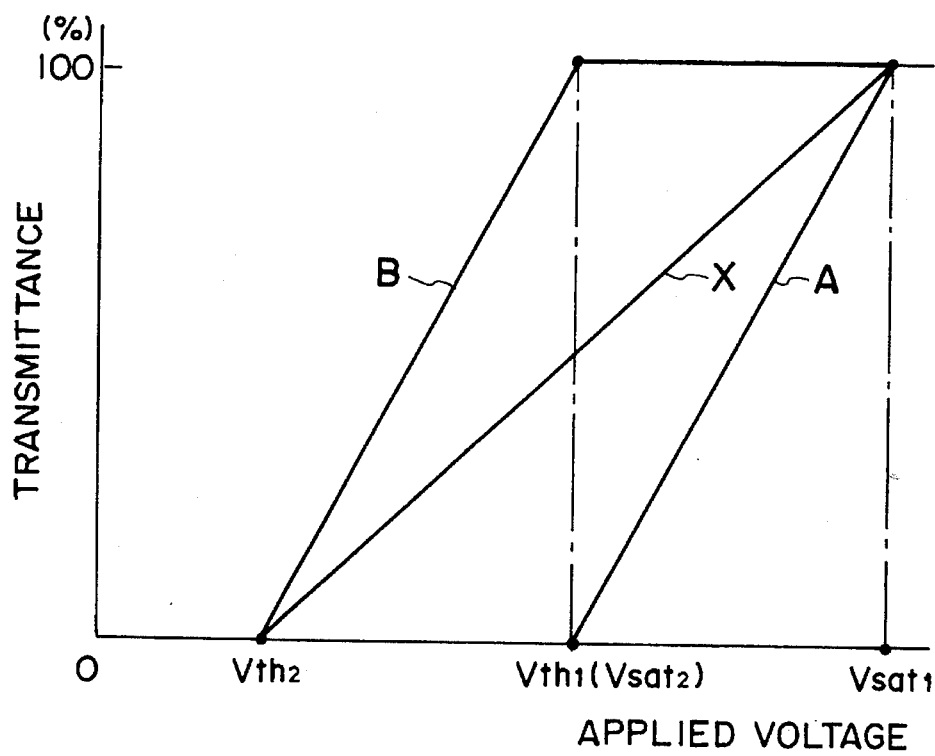

Now, if $Vth_1 \approx Vsat_2$, the individual V-T characteristic curves A and B in FIG. 5 can be rewritten as shown in FIG. 6, and a combination of the individual V-T characteristic curves A and B provides a synthetic V-T characteristic curve X as shown in FIG. 6.

Figure 7:
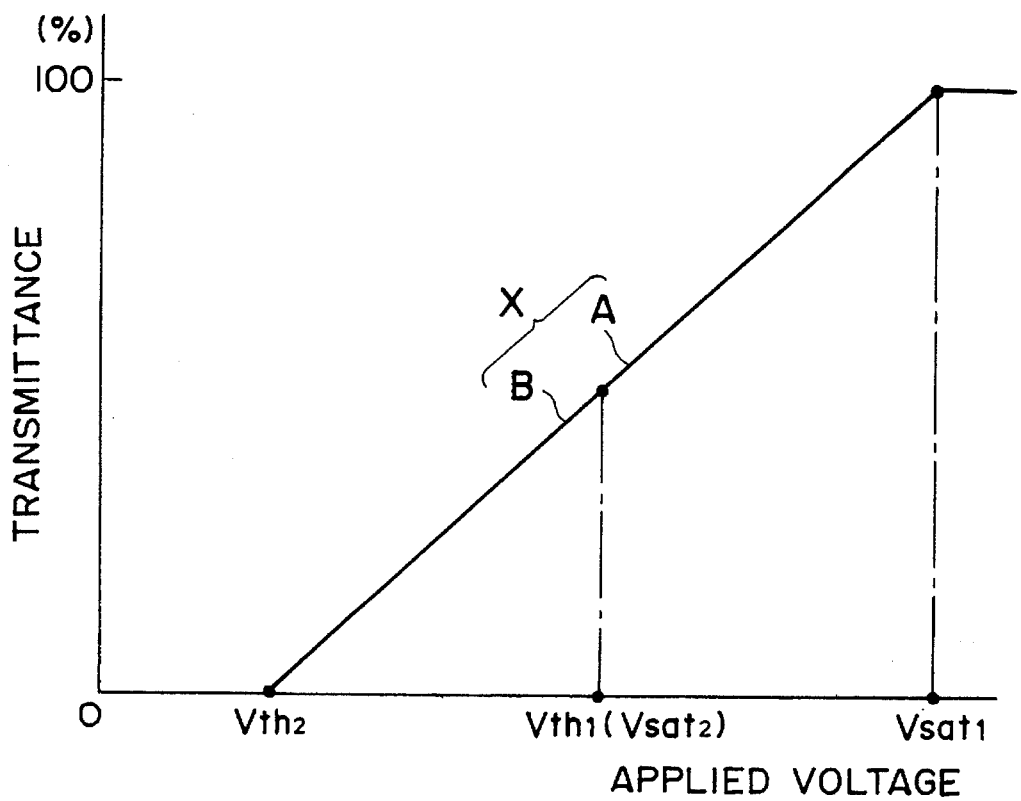
FIG. 7 is an illustration of a synthetic V-T characteristic curve obtained from two curves shown in FIG. 6.

The synthetic V-T characteristic curve X shown in FIG. 6 may be re-indicated as shown in FIG. 7. As is clearly understood from FIG. 7, as a result of $Vth_1 \approx Vsat$, the individual V-T characteristic curves A and B are reduced to a substantially single continuation of V-T characteristic curve X which represents a preferred characteristic. Further, if the individual V-T characteristic curves A and B provide a substantially identical slope γ, the synthetic V-T characteristic curve X is reduced to a single straight line having a substantially identical slope, which represents a further preferred characteristic.

Herein, the value γ represents a ratio of (inversion saturation value)/(inversion threshold value) for a liquid crystal region 3a or 3b corresponding to the individual V-T characteristic curve A or B. More specifically, the slope values γ of the individual V-T characteristic curves A and B are represented by $Vsat_1/Vth_1$ and $Vsat_2/Vth_2$, respectively.

On the other hand, the value γ may vary depending on the characteristics attributable to the ferroelectric liquid crystal material, the insulating film and the electrodes 1a and 1b and, as described above, can be adjusted by controlling the ratio of the areas in plane or horizontal section of the projections and the indentations at the respective liquid crystal regions 3a and 3b. Accordingly, the value γ can be adjusted by adjusting the ratio at each of the liquid crystal regions 3a and 3b. Generally, the γ values of the respective regions 3a and 3b can be approximated to each other by making the ratios for the regions 3a and 3b substantially identical to each other.

Next, the third embodiment will be described.

A liquid crystal display device according to this embodiment shown in FIG. 8 is basically similar to the one shown in FIG. 1 according to the first embodiment wherein a pixel (or the liquid crystal layer 2) is divided into sub-pixels (or liquid crystal regions) including a pair of sub-pixels 3a and 3b respectively having stripe-shaped projections and indentations and differentiated from each other by their projection widths or indentation widths, and the sub-pixels 3a and 3b are provided with masks 4 capable of interrupting transmission light (on, e.g., a substrate 7a) so that the inversion threshold value of one of the sub-pixels 3a and 3b is substantially identical to the inversion saturation value of the other.

Figure 9:
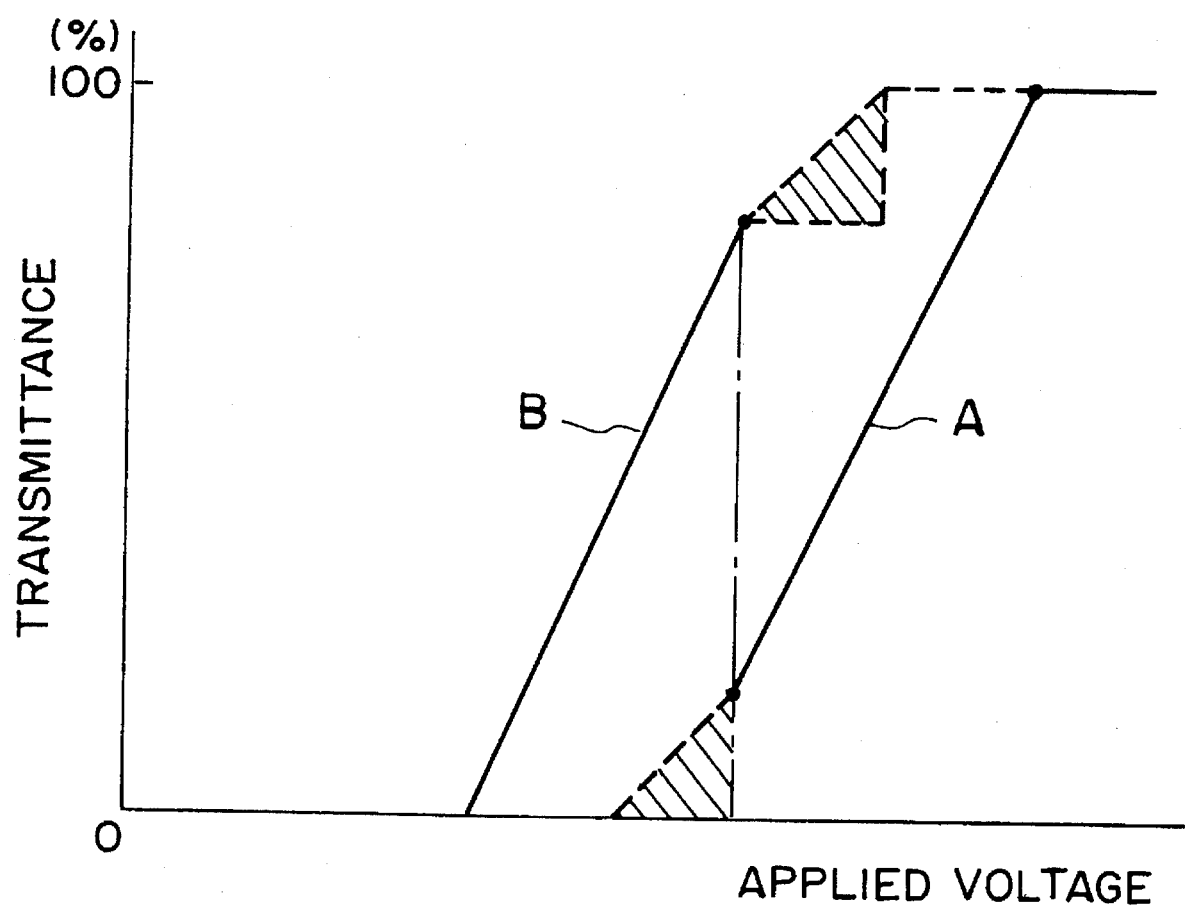
FIG. 9 is an illustration of V-T characteristic curves for respective regions in an embodiment of a liquid crystal display device having a structure as shown in FIG. 8.

In the case where such masks 4 are provided, the individual V-T characteristic curves A and B may be modified as shown in FIG. 9, in which the hatched regions represent the regions of interruption of transmission light by the masks 4.

More specifically, in the embodiment shown in FIGS. 8 and 9, the masks 4 are disposed in substantial alignment with the projections in the sub-pixel region 3a and the indentations in the sub-pixel region 3b so as to provide a substantial alignment between the inversion threshold voltage of the individual V-T characteristic curve A and the inversion saturation voltage of the individual V-T characteristic curve B.

Incidentally, in the embodiments shown in FIGS. 8 and 9, the masks are provided in both the liquid crystal (or sub-pixel) regions 3a and 3b, but it is also possible to provide the masks 4 in only one of the regions 3a and 3b if the inversion threshold voltage and the inversion saturation voltage can agree to each other thereby.

In the above embodiment described with reference to FIGS. 8 and 9, each pixel involves only two sub-pixels 3a and 3b having different indentation widths or projection widths. On the other hand, in case where a pixel is divided into three or more sub-pixels having different indentation widths or projection width, the above-mentioned modification of individual V-T characteristics by provision of masks 4 should preferably be applied to at least one pair of sub-pixels including one having a maximum indentation width (or projection width) and the other having a minimum indentation width (or projection width) as such sub-pixels are liable to be accompanied with a large degree of flexure.

Incidentally, an ultimate object of the present invention is to provide an ideal analog gradational display characteristic, for which it is desirable to provide N+1 or more, preferably 2N+1 or more, gradation levels in case where the number of sub-pixel (liquid crystal) regions 3a, 3b, (3C, 3d) ... is N. Based on this criterion, tolerances for the respective conditions required in the present invention will be considered.

First of all, in order to obtain N+1 or more gradation levels, the tolerable deviation is at most 1/(N+1), which requires the satisfaction of the formula (2) below when the average deviation or error for the respective sub-regions 3a, 3b, ... is represented by σ.

Further, in order to provide (2N+1) or more levels, the following formula (3) is required to be satisfied:

$$\sigma < 1/(N+1)N^{+e_{fra} \, 1/2} + ee \quad (2)$$

$$\sigma < 1/(2N+1)N^{+e_{fra} \, 1/2} + ee \quad (3)$$

The above formulae (2) and (3) can be referred to as parameters indicating the range of tolerable errors for the respective conditions to be satisfied in the present invention. More specifically, the substantial identicality or substantial alignment required in each aspect (or embodiment) of the present invention is satisfied if the deviation is in the range of ±σ satisfying the above-mentioned formula (2), and it is preferred that the deviation is in the range of ±σ satisfying the formula (3).

The stripe-shaped unevennesses (projections or indentations) may preferably be disposed at an appropriate pitch selected in view of the other factors, such as a ferroelectric liquid crystal, a cell thickness, etc., which pitch may preferably be a half or more of the chiral pitch of the liquid crystal, generally in the range of 3–50 μm. Further, a narrower one of the projections and indentations may preferably have a width which is at least the liquid crystal layer thickness and is generally 1 μm or larger. Further, the stripe length may preferably be at least the chiral pitch of the liquid crystal, more specifically at least three times, more preferably at least 10 times, the width of the narrower one of the projections and indentations. The stepwise difference in height between the projections and indentations may be determined so as not to remarkably disorder the alignment state of the liquid crystal and more specifically be at most a half the liquid crystal layer thickness, generally preferably in the range of 100 to 5000 Å.

Hereinbelow, the present invention will be described based on specific Examples.

Example 1

Figure 10:
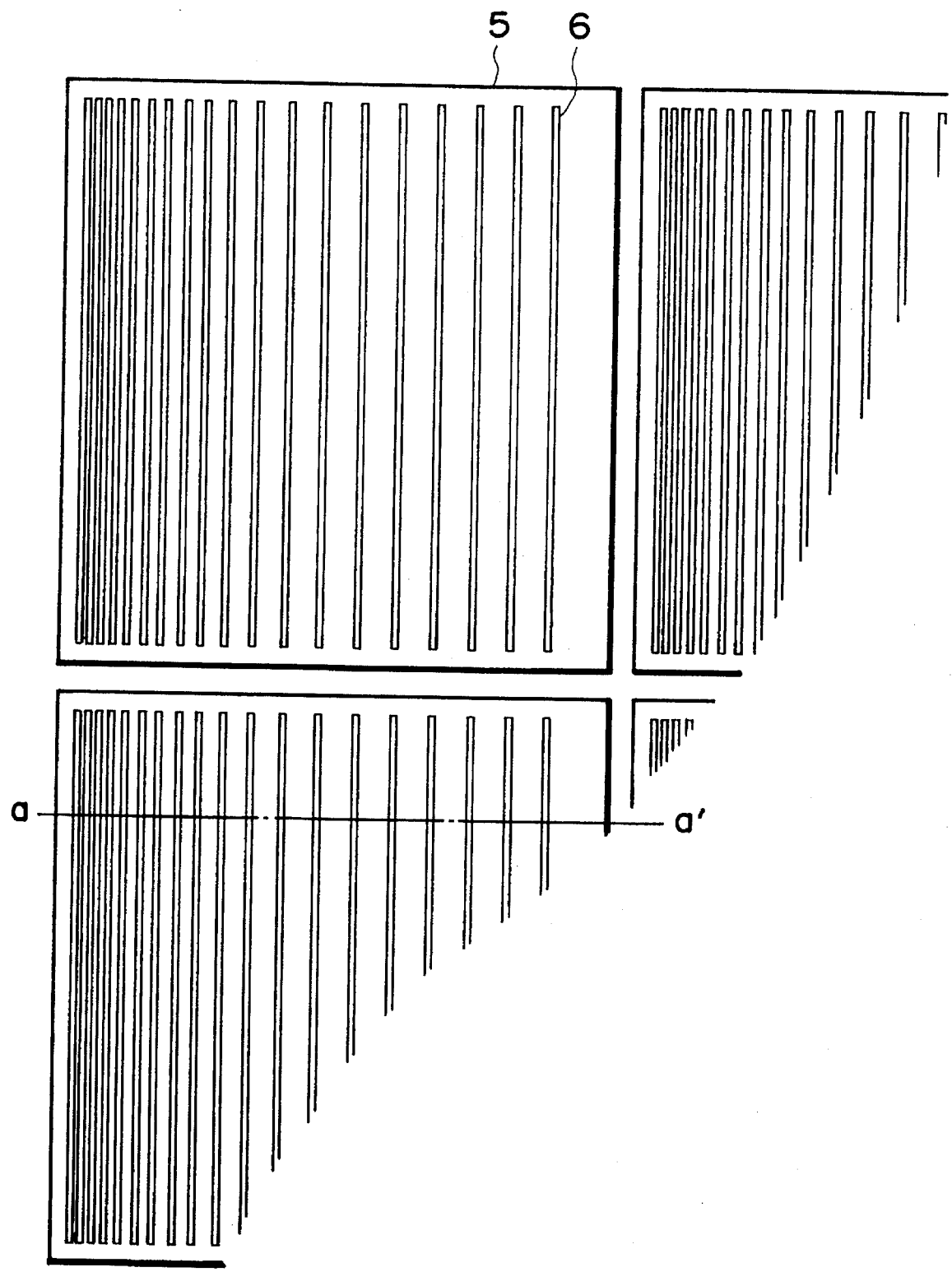
FIG. 10 is a stripe-shaped unevenness pattern in a liquid crystal display device prepared in Example 1.
Figure 11:
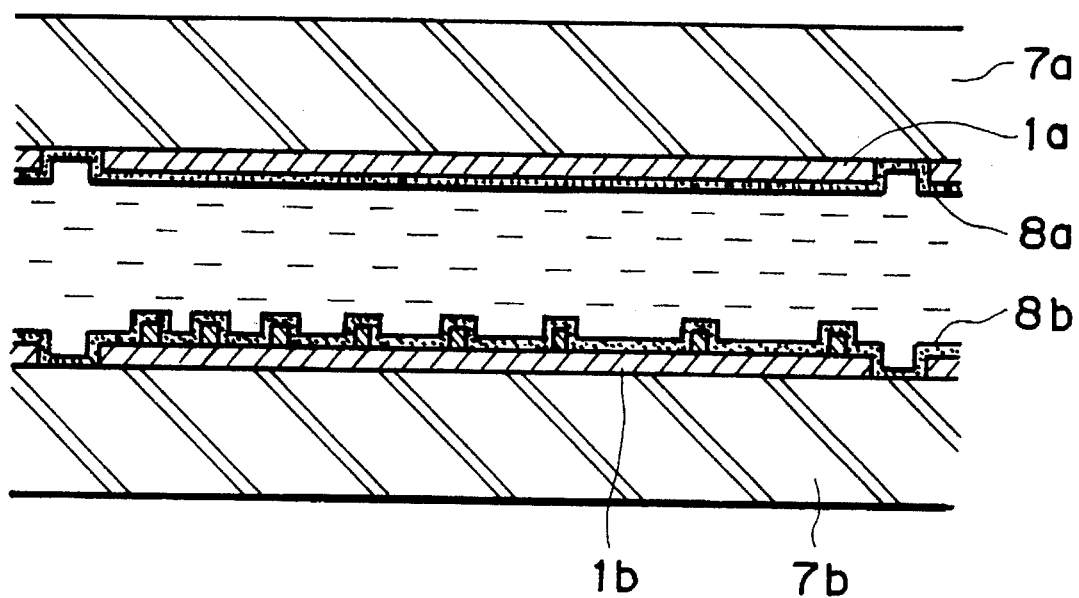
FIG. 11 is a view of an a—a' section in FIG. 10.

FIG. 10 is a partial plan view showing an unevenness pattern formed in a liquid crystal device of this Example and FIG. 11 is a sectional view taken along a line a—a' in FIG. 10.

Referring to FIG. 10, each pixel area 5 measuring sizes of 200 μm-square was provided with a plurality of stripe-shaped projections 6 having a width of 3 μm and disposed with different spacings ranging from 1 μm at the densest part to 15 μm at the sparsest part.

More specifically, referring to FIG. 11, a pair of glass plates 7a and 7b were provided with electrodes 1a and 1b of ITO films, respectively. The electrodes 1a were formed in a stripe electrode pattern through one cycle of photolithographic steps, and the electrodes 1b were formed in a stripe electrode pattern and further provided with stripe projections (6 in FIG. 10) in a height of ca. 1500 Å through two cycles of lithographic steps.

Figure 12:
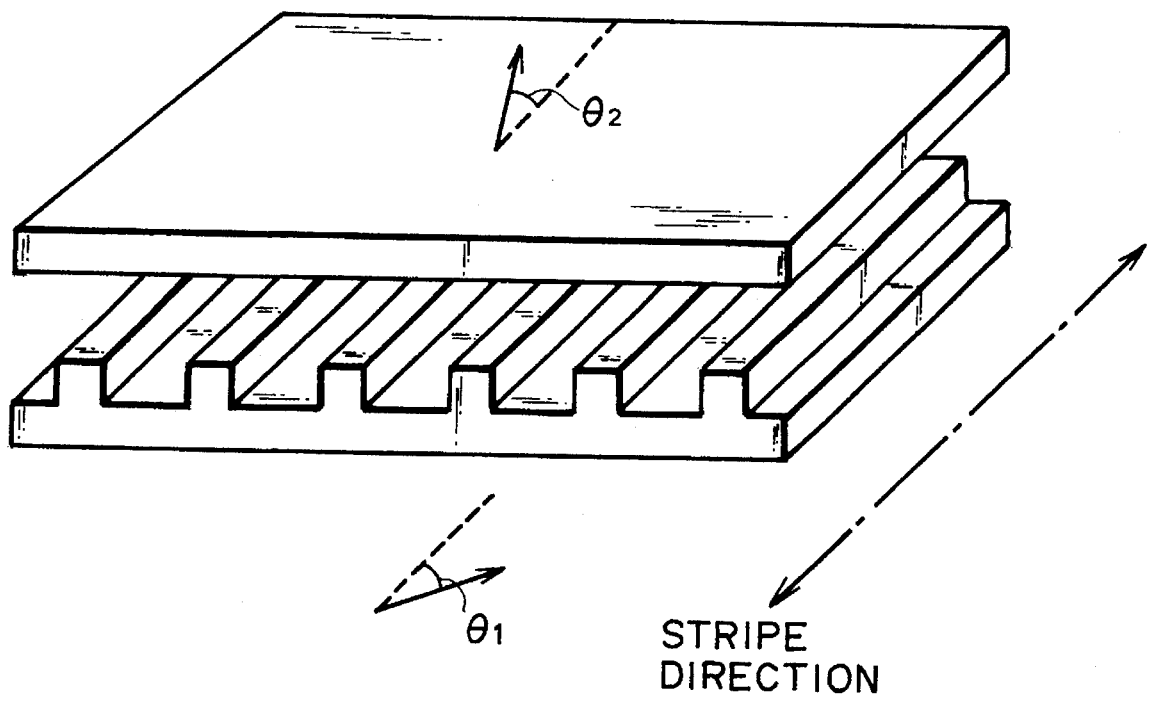
FIG. 12 is an illustration of rubbing directions applied to the liquid crystal display device prepared in Example 1.

The electrodes 1a and 1b were further respectively coated with 200 Å-thick polyimide alignment films 8a and 8b which were respectively rubbed in directions of angles $\theta_2$ and $\theta_1$, with respect to the direction of extension of stripe projections (6 in FIG. 10), which angles $\theta_2$ and $\theta_1$ were taken positive in a clockwise direction and negative in a counterclockwise direction as viewed from the upper substrate 7a carrying the electrodes 1a not provided with the stripe projections. In this particular Example, $\theta_1$ and $\theta_2$ were taken at 0 degree and −10 degrees, respectively, (not in conformity with the state shown in FIG. 12).

The two substrates 7a and 7b were then applied to each other so as to provide the above-mentioned $\theta_1$ and $\theta_2$ relationships and form a cell gap of 1.4 µm, which was then filled with a ferroelectric liquid crystal. The resultant liquid crystal device showed a good alignment state.

The above-mentioned stepwise difference in height of ca. 1500 Å of the stripe projections (6 in FIG. 10) was determined in the following manner.

Figure 13:
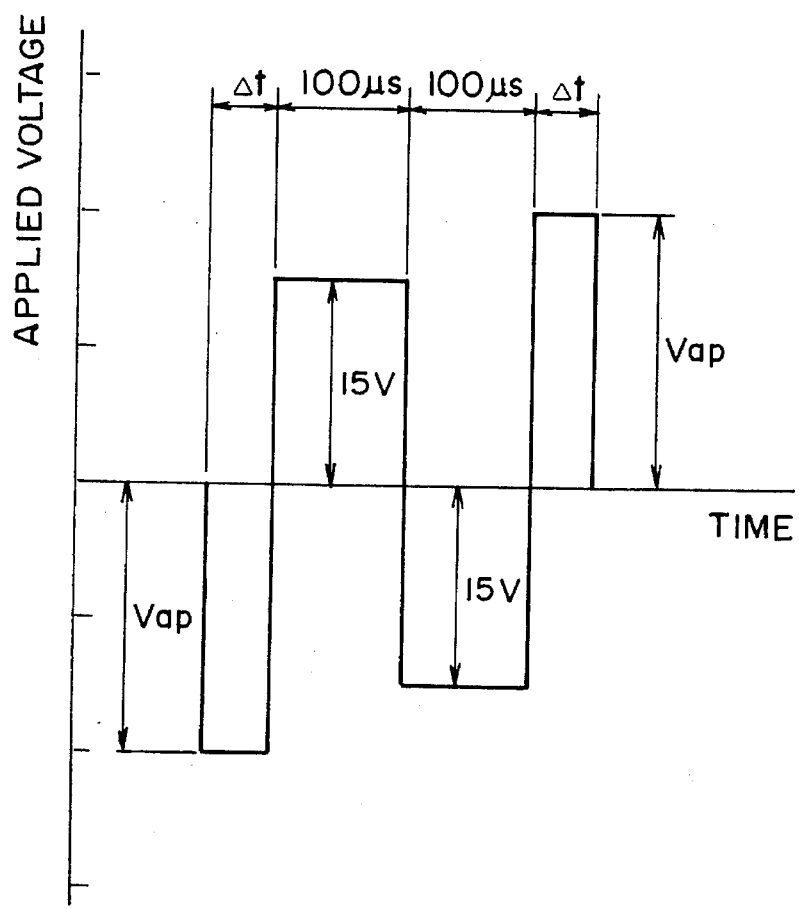
FIG. 13 is a waveform diagram showing drive voltage pulses used in Example 1.

A comparative liquid crystal device was prepared in the same manner as above except that no stripe projections (6 in FIG. 10) were formed on the electrodes 1b either and pulse voltages as shown in FIG. 13 were applied between the electrodes 1a and 1b while varying the amplitude Vap at a fixed pulse width $\Delta t=20$ µsec, whereby the comparative device provided a $\gamma$ (=Vap.sat/Vap.th)=1.12. By substituting D=1.4 µm=1.4×10$^4$ Å and $\gamma$ (=$\lambda$)=1.12 in the above-mentioned equation of d/D=1−(1/$\lambda$), d was calculated as ca. 1500 Å.

Figure 14:
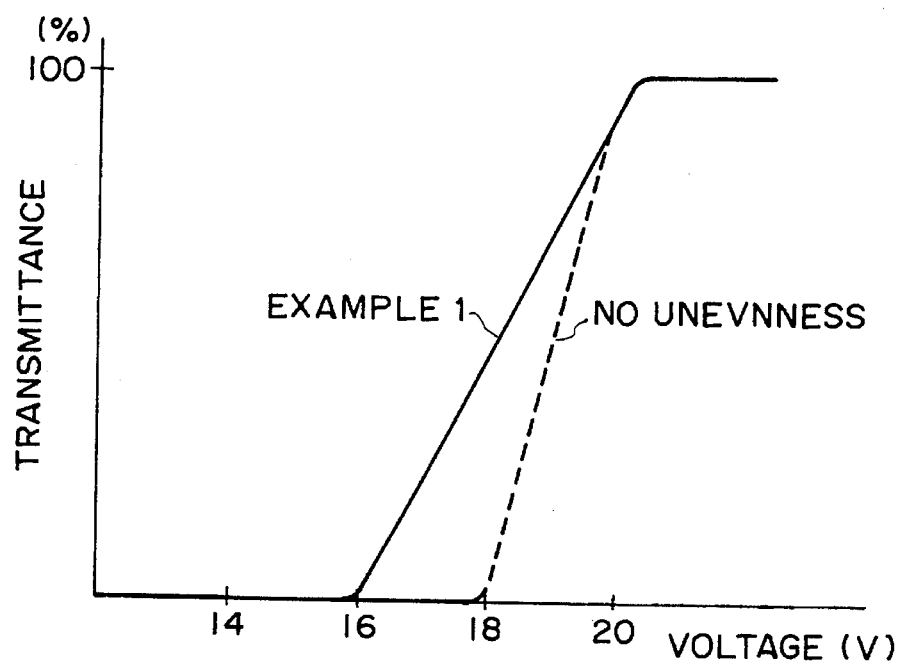
FIG. 14 is an illustration of a V-T characteristic curve of the liquid crystal display device prepared in Example 1.

When pulse voltages as shown in FIG. 13 were applied between the electrodes 1a and 1b of the liquid crystal device prepared in the above-described manner of this Example, a linear V-T characteristic curve as represented by a solid line in FIG. 14 was obtained at a pulse width $\Delta t=20$ µsec.

As is understood from FIG. 14, the resultant V-T characteristic curve was substantially linear and showed a $\gamma$ (Vsat/Vth) for a whole pixel of about 1.26 which was remarkably advantageous compared with the above-mentioned $\gamma=1.12$ of the comparative liquid crystal device having no stripe projections, the V-T characteristic curve of which is represented by a dashed line in FIG. 14.

Example 2

Figure 15:
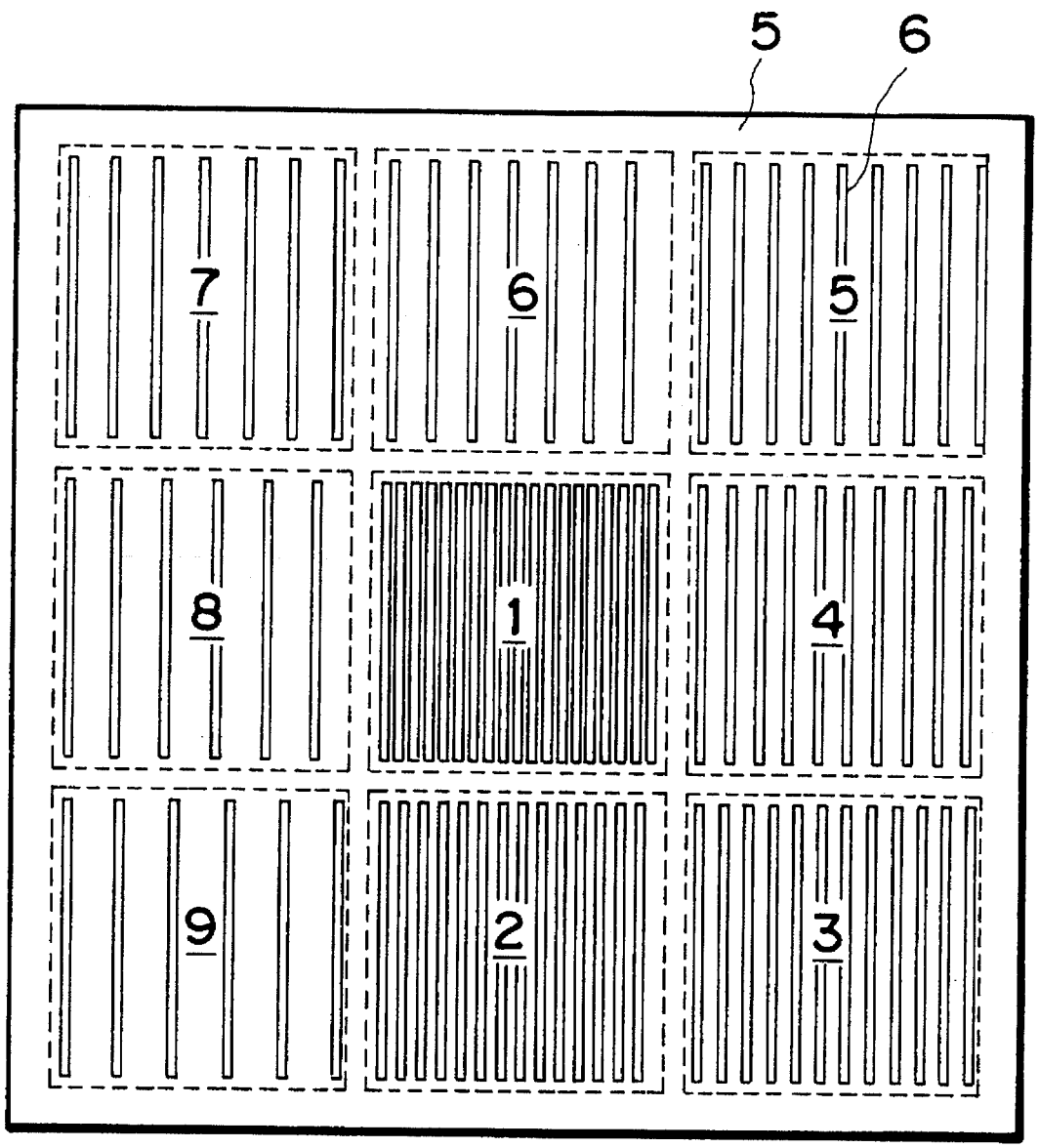
FIG. 15 is a stripe-shaped unevenness pattern in a liquid crystal display device prepared in Example 2.

FIG. 15 is a plan view showing an unevenness pattern formed in a liquid crystal device of this Example. More specifically a liquid crystal device having stripe-shaped projections 6 disposed at 10 density levels ranging from the densest sub-pixel region 1 to the sparsest sub-pixel region 10 in each pixel 5 as shown in FIG. 10 was prepared otherwise in the same manner as in Example 1, e.g., with respect to the liquid crystal material, cell gap, rubbing directions and manner of application.

The resultant liquid crystal device showed a good alignment state and, as a result of measurement of the optical response characteristic in the same manner as in Example 1, the liquid crystal device provided a linear V-T characteristic curve with good gradation characteristic similarly as in Example 1.

Example 3

Figure 16:
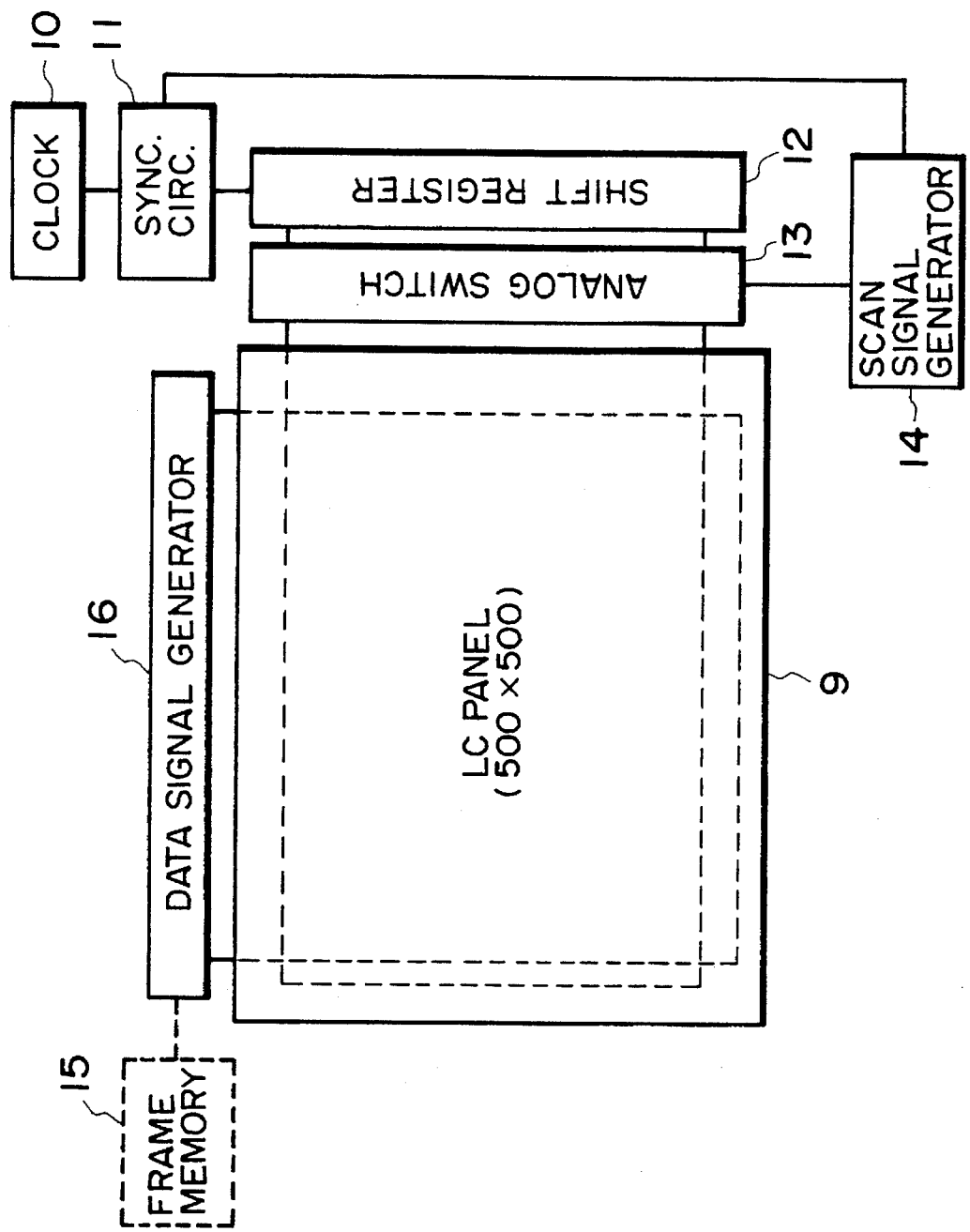
FIG. 16 is a block diagram illustrating a liquid crystal display apparatus according to the present invention.

A liquid crystal device prepared in Example 2 so as to form a matrix panel having 500×500 pixels (5 in FIG. 15) was incorporated as a liquid crystal panel 9 in a liquid crystal display apparatus having a peripheral arrangement as shown in FIG. 16 (which arrangement may also be applied to the other Examples and embodiments).

Referring to FIG. 16, the peripheral circuit of the liquid crystal apparatus may include a clock 10, a synchronizing circuit 11, a shift register 12, an analog switch 13, a scanning signal generator 14, a frame memory 15 and a data signal generator 16 by which image signals from the frame memory 15 are converted into data signals. In actual loading, these peripheral circuit members may be disposed in any arrangement inclusive of, e.g., on one or both of the upper and lower sides of the matrix panel 9 and/or on one or both of the left and right sides of the matrix panel 9.

The data signal modulation applied to the above-mentioned liquid crystal display apparatus may be according to any voltage modulation mode, i.e., not only voltage pulse amplitude modulation as principally described above, but also voltage pulse width modulation, or voltage pulse phase modulation which may be effective in controlling the propagation time of a chiral liquid crystal domain connected so as to cause elastic propagation in the chiral smectic C layer direction. The combination of the above-mentioned modulation modes may also be applicable.

Accordingly, the inversion saturation value (or voltage) and the inversion threshold value (or voltage) on the V-T characteristic curve may be determined based on any of voltage amplitude, pulse width, pulse phase and a combination of these parameters.

The above-prepared liquid crystal panel 9 of this Example could provide a good gradational display according to any voltage modulation mode as described above.

Example 4

A liquid crystal device was prepared in the same manner as in Example 1 except that the projection width/the indentation width distribution was changed so as to range from 1 µm/1 µm at the densest part to 5 µm/15 µm at the sparsest part.

Pulse voltages similar to those used in Example 1 were applied between the opposite electrodes 1a and 1b in the resultant liquid crystal device, whereby the liquid crystal device showed a linear V-T characteristic at $\Delta t=20$ µsec and a $\gamma$ (Vsat/Vth)=ca. 1.26 for an entire pixel indicating an advantageous characteristic for gradational display.

Example 5

A liquid crystal display device having an unevenness pattern similar to the one used in Example 2 was prepared except the combination of the projection width/the indentation width was changed so as to range similarly as in Example 4 from the densest part to the sparsest part.

The resultant liquid crystal device showed a good alignment state and, as a result of measurement of the optical response characteristic in the same manner as in Example 1, the liquid crystal device provided a linear V-T characteristic with good gradation characteristic similarly as in Example 4.

Example 6

A liquid crystal device prepared in Example 5 so as to form a matrix panel was incorporated in a liquid crystal display apparatus and subjected to image display as in Example 3, whereby good gradational display could be attained similarly as in Example 3.

Example 7

A liquid crystal device was prepared in a similar manner as in Example 1 except that one of the glass plates was provided with patterned light interrupting masks of a 1500 Å-thick vapor-deposited Cr film at parts corresponding to indentations in a left-side region of a large unevenness pitch (in a width of ¼ of the entire pixel width) and at parts corresponding to projections in a right side region of a small unevenness pitch (in a width of ¼ of the entire pixel width).

Pulse voltages similar to those used in Example 1 were applied between the opposite electrodes in the resultant liquid crystal device, whereby the liquid crystal device showed a linear V-T characteristic at $\Delta t=20$ μsec and a γ (Vsat/Vth)=ca. 1.28 for an entire pixel indicating an advantageous characteristic for gradational display.

Example 8

A liquid crystal display device having an unevenness pattern similar to the one used in Example 2 was prepared except that the light interrupting Cr masks were formed similarly as in Example 7.

The resultant liquid crystal device showed a good alignment state and, as a result of measurement of the optical response characteristic in the same manner as in Example 1, the liquid crystal device provided a linear V-T characteristic with good gradation characteristic similarly as in Example 7.

Example 9

A liquid crystal device prepared in Example 8 so as to form a matrix panel was incorporated in a liquid crystal display apparatus and subjected to image display as in Example 3, whereby good gradational display could be attained similarly as in Example 3.

As described above, according to the present invention, it is possible to provide a liquid crystal device showing a linear V-T characteristic curve with an appropriate slope suitable for gradational display by using a ferroelectric liquid crystal, so that the temperature compensation and the designing of a drive circuit therefor can be remarkably simplified.

What is claimed is:

1. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the liquid crystal layer has a thickness D corresponding to the indentation in a region having a largest indentation width with respect to a projection height d, and a ratio d/D is set to be substantially equal to $1-(1/\lambda)$ wherein λ denotes a ratio of inversion saturation value and inversion threshold value at the liquid crystal layer thickness D.

2. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the projections have a smaller width in a region having a smaller indentation width than in a region having a larger indentation width.

3. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses, and a pixel is divided into a plurality of pixel regions including at least a pair of regions respectively provided with plural stripe-shaped projections and indentations and having mutually different projection widths or indentation widths, and each pixel is provided with light-interrupting masks so that one of the pair of regions has an inversion threshold voltage which is substantially equal to an inversion saturation voltage of the other of the pair of regions.

4. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D–d, such that each region has a respective density of said at least one second portion relative to said at least one first portion and one of said regions has a sparsest one of said densities, a ratio d/D being set to be substantially equal to $1-(1/\lambda)$ wherein λ denotes a ratio of inversion saturation value and inversion threshold value at the region having the sparsest density.

5. A liquid crystal device according to claim 4, wherein each said second portion is formed corresponding to a projection at a height d on at least one of the opposing electrodes.

6. A liquid crystal device according to claim 4, wherein each said second portion is formed corresponding to a stripe projection at a height d on at least one of the opposing electrodes.

7. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D–d and each first and second portion further having a respective width, such that each region has a respective density of said at least one second portion relative to said at least one first portion, wherein each said second portion in a region having a relatively lower density has a greater width than each said second portion in a region having a relatively higher density.

8. A liquid crystal device according to claim 7, wherein each said second portion is formed corresponding to a projection at a height d on at least one of the opposing electrodes.

9. A liquid crystal device according to claim 7, wherein each said second portion is formed corresponding to a stripe projection at a height d on at least one of the opposing electrodes.

10. A liquid crystal device, comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D−d, such that each region has a respective density of said at least one second portion relative to said at least one first portion, and wherein a pixel has a light-interrupting mask corresponding to each said second portion.

11. A liquid crystal device according to claim 10, wherein each said second portion is formed corresponding to a projection at a height d on at least one of the opposing electrodes.

12. A liquid crystal device according to claim 10, wherein each said second portion is formed corresponding to a stripe projection at a height d on at least one of the opposing electrodes.

13. A liquid crystal device according to any one of claims 1–4, 7 and 10, wherein said liquid crystal is a ferroelectric liquid crystal.

14. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the liquid crystal layer has a thickness D corresponding to the indentation in a region having a largest indentation width with respect to a projection height d, and a ratio d/D is set to be substantially equal to $1-(1/\lambda)$ wherein $\lambda$ denotes a ratio of inversion saturation value and inversion threshold value at the liquid crystal layer thickness D.

15. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses by forming on a substrate pluralities of stripe-shaped projections and indentations at locally different indentation widths so that the projections have a smaller width in a region having a smaller indentation width than in a region having a larger indentation width.

16. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is provided with locally varying thicknesses, and a pixel is divided into a plurality of pixel regions including at least a pair of regions respectively provided with plural stripe-shaped projections and indentations and having mutually different projection widths or indentation widths, and each pixel is provided with light-interrupting masks so that one of the pair of regions has an inversion threshold voltage which is substantially equal to an inversion saturation voltage of the other of the pair of regions.

17. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D−d, such that each region has a respective density of said at least one second portion relative to said at least one first portion and one of said regions has a sparsest one of said densities, a ratio d/D being set to be substantially equal to $1-(1/\lambda)$ wherein $\lambda$ denotes a ratio of inversion saturation value and inversion threshold value at the region having the sparsest density.

18. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D–d and each first and second portion further having a respective width, such that each region has a respective density of said at least one second portion relative to said at least one first portion, wherein each said second portion in a region having a relatively lower density has a greater width than each side second portion in a region having a relatively higher density.

19. A liquid crystal apparatus comprising:

a data signal generator;

an analog switch;

a shift register; and a liquid crystal device, said data signal generator supplying data signals to said liquid crystal device through said analog switch and said shift register, and said liquid crystal device comprising: a pair of substrates having mutually opposing electrodes thereon, and a liquid crystal layer disposed between the substrates so as to form a pixel comprising a pair of the opposing electrodes and the liquid crystal layer therebetween, wherein the liquid crystal layer in a pixel is divided into a plurality of regions, each region having at least one first portion at which the liquid crystal layer has a thickness D and at least one second portion at which the liquid crystal layer has a lesser thickness D–d, such that each region has a respective density of said at least one second portion relative to said at least one first portion, and wherein a pixel has a light-interrupting mask corresponding to each said second portion.

20. A liquid crystal apparatus according to any one of claims 14–19, further including a frame memory.

* * * * *

UNITED STATES PATENT AND TRADEMARK OFFICE
CERTIFICATE OF CORRECTION

PATENT NO. : 5,581,381

DATED : December 3, 1996

INVENTOR(S) : KATSUHIKO SHINJO, ET AL.    Page 1 of 2

It is certified that error appears in the above-identified patent and that said Letters Patent is hereby corrected as shown below:

IN THE DRAWINGS

Sheet 8 of 10, FIG. 14, "UNEVNNESS" should
    read --UNEVENNESS--.

COLUMN 3

Line 60, "show" should read --shown--.

COLUMN 8

Line 17, "$\sigma<1/(N+1)N^{+e,fra\ 1/2}+ee$" should
    read --$\sigma<1/(N+1)N^{1/2}$--.

Line 19, "$\sigma<1/(2N+1)N^{+e,fra\ 1/2}+ee$" should
    read --$\sigma<1/(2N+1)N^{1/2}$--.

UNITED STATES PATENT AND TRADEMARK OFFICE
CERTIFICATE OF CORRECTION

PATENT NO. : 5,581,381

DATED : December 3, 1996

INVENTOR(S) : KATSUHIKO SHINJO, ET AL.

It is certified that error appears in the above-identified patent and that said Letters Patent is hereby corrected as shown below:

COLUMN 15

Line 9, "side" should read --said--.

Signed and Sealed this

Seventeenth Day of June, 1997

Attest:

Attesting Officer

BRUCE LEHMAN

Commissioner of Patents and Trademarks